United States Patent [19]

Chuang

[11] Patent Number: 5,119,845
[45] Date of Patent: Jun. 9, 1992

[54] DEVICE OF WATER PLUG NOISE ELIMINATION AND WATER SEAL FLUSH TOILET

[76] Inventor: M. J. Chuang, Chang-Chin N Road, Taipei, Taiwan, 111

[21] Appl. No.: 711,956

[22] Filed: Jun. 7, 1991

[51] Int. Cl.⁵ .................. F16K 31/26; F16K 33/00; F16K 47/02; F16K 47/08
[52] U.S. Cl. .................. 137/436; 137/441; 251/120
[58] Field of Search ............ 137/434, 436, 441; 251/118, 120; 138/44, 45, 46

[56] References Cited

U.S. PATENT DOCUMENTS

| | | | |
|---|---|---|---|
| 1,525,334 | 2/1925 | Stengel | 137/436 |
| 1,625,921 | 4/1927 | Valtier | 251/120 |
| 1,787,601 | 1/1931 | Swanberg | 137/436 |
| 1,901,633 | 3/1933 | Clemmons | 137/436 |
| 2,086,637 | 7/1937 | Price et al. | 137/441 |
| 2,300,466 | 11/1942 | Peterson | 137/436 |
| 2,304,272 | 12/1942 | Mueller et al. | 137/436 |
| 3,516,094 | 6/1970 | Reagan | 137/436 |

Primary Examiner—George L. Walton
Attorney, Agent, or Firm—Bacon & Thomas

[57] ABSTRACT

This invention relates to an improvement of a float valve device, and more particularly to a float valve device including a water plug noise elimination and water seal assembly for flush toilets, with its major features of adding a noise eliminating water inlet unit at the water outlet structure of such a flush toilet, by using the bores surrounding the water inlet unit to produce the compliant flow during water intake by applying the flux dynamics principle to kill the noise, and by adding a triangle spring within the water outlet seat below a float crank rod to function as the indirect pivot of a float lever to achieve a load-saving purpose and to increase the water seal rate, and since the pivot is at lower position, the float is able to precisely open and close the water inlet to avoid the tear and wear of the water seal washer so as to prolong the service life of the water seal device while achieving the purpose of saving the water supply.

3 Claims, 5 Drawing Sheets

DEVICE OF WATER PLUG NOISE ELIMINATION AND WATER SEAL FLUSH TOILET

BACKGROUND AND SUMMARY OF THE INVENTION

This invention relates to an improvement of a float valve device, and more particularly to a float valve device including a water plug noise elimination and water seal assembly for flush toilets, essentially comprising a water inlet structure, a water outlet structure and a float unit, within, the water inlet structure including water inlet seat, water inlet axle, water seal washer, O-ring at water inlet seal seat and the main portion of the water inlet pipe; the water outlet structure including noise elimination water inlet unit, U-packing, water seal packing, axle, triangle spring, and the main portion of water outlet pipe while the float unit including float, float lever and crank bar set; featuring mainly the sue of the pores in round shape surrounding the water inlet unit to achieve the flow compliance in the water outlet structure by fluid mechanics during the water intake to eliminate the water hammering sound caused by the impacts of water current, thus to obtain the effect of noise elimination, and by the withstanding from the triangle spring, the supporting point at the float lever is under less stress, so to increase the rate of water seal, furthermore, there is a specified track in between the water inlet structure and the main portion of water inlet pipe allowing the precise on and off operation at the inlet to avoid the tear and wear of the water washer for increasing the service life of the water seal device while also preventing the waste of water consumption of the flush toilet.

Essentially, the water seal device in the flush toilet found in the present market applies the working principle of suspension arm to notify the timing of water intake and water seal while its supporting point rests on where the tail end of the float lever meets the hexagon cover is screwed to, leading to be vulnerable to the following defects: (1) although with the fixed head, the water seal is at slower rate because of the higher supporting point at the float lever applying the suspension arm and as a consequence, leading to the partial loss of water source; (2) the absence of a fixed tract for the ups and downs movement of the water seal structure, the hexagon cover seat indicating flat construction and the smaller circumference of water inlet packing, though with higher thickness, are causing the water seal washer easily be moved and wearing thus to reduce the precision of ons and offs operation at the water inlet and fail to achieve bona fide water seal; and (3) the small space within the hexagon cover seat is attributable to the water hammering noise during water intake, which is very annoying particularly in mid-night hours.

With the aforesaid defects in mind, this inventor based on years of practical manufacturing experience of sanitary wares and after many times of experiments, has invented an improvement device of water plug noise elimination and water seal for flush toilet by using the similar muffling principle adopted by the exhaust system to motorcycle to the porous water inlet unit of the present invention to achieve the noise elimination effect during water intake while by the addition of a triangle spring within the water outlet seat to indirectly withstand the float lever, making the supporting point of the float be under less stress and to increase the speed of water seal.

Accordingly, the chief object of the present invention is to provide an improved device of noise elimination and water seal for flush toilet by the flow compliance produced during the water intake in the cistern in conjunction with the round pores surrounding the noise eliminating water inlet unit with the larger space with the water outlet pipe seat, to prevent from the water roaring sound thus to achieve the purpose of noise elimination.

Another object of the present invention is to increase the water seal rate so to prevent the loss of water supply as by using the leverage principle the float supporting point being subject to less stress the triangle spring, added in the water outlet seat to hold indirectly against the float lever, when at low water lever, is making the float slightly elevate, though with a fixed head.

The further another purpose of the present invention is to, by using the fixed tract the water inlet structure is acting within the main portion of the water inlet pipe for achieving the precise ons and offs of the water inlet, arrive at the bona fide water seal effect, thus to prevent the water seal washer from wearing and to prolong the service life of the water seal device.

BRIEF DESCRIPTION OF THE DRAWINGS

The present invention will become more readily apparent from the following description of the preferred embodiment of the present invention taken in conjunction with the accompanying drawing, in which.

DETAILED DESCRIPTION OF A PREFERRED EMBODIMENT

Figure 1:
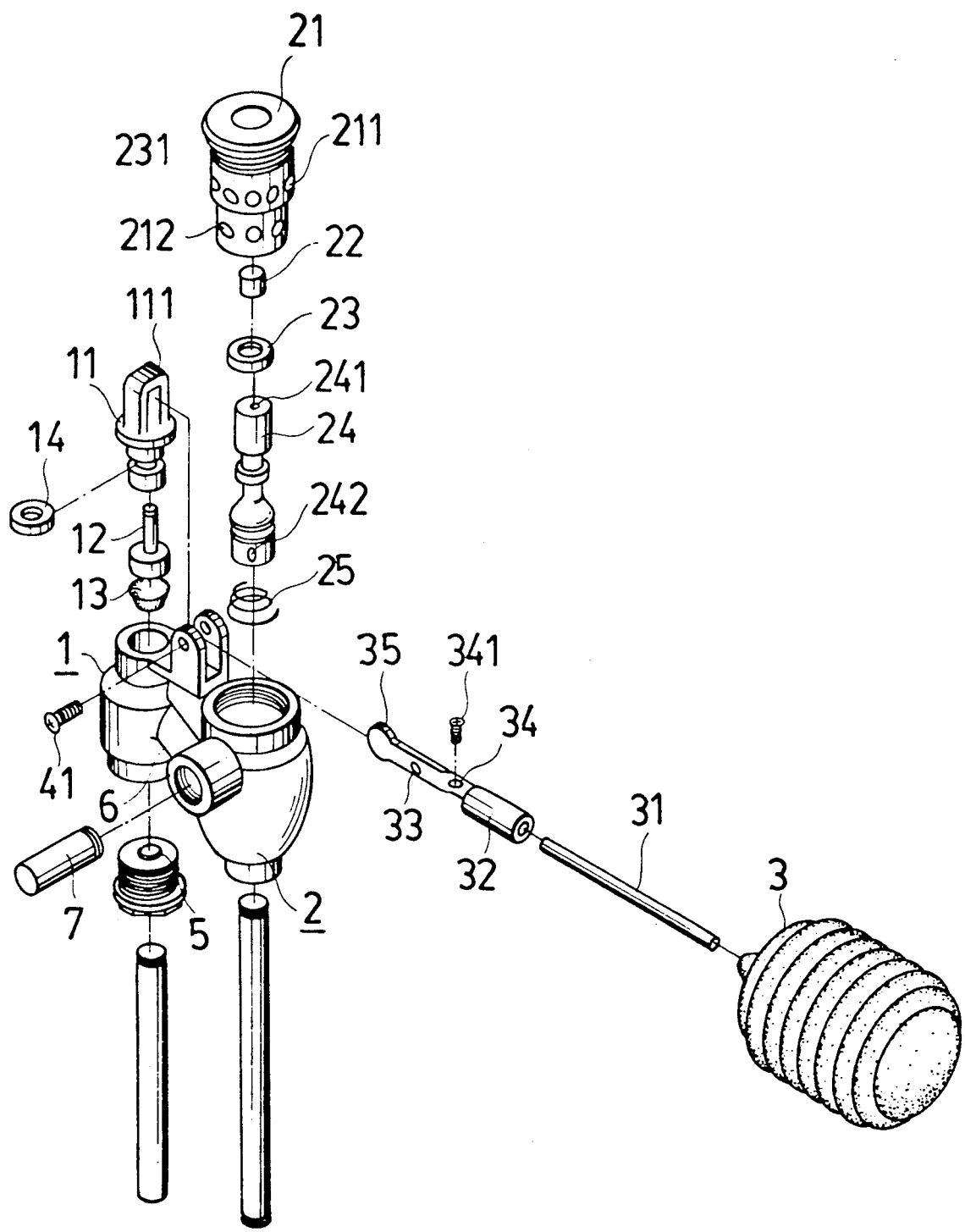
FIG. 1 is a view of the breakdown of the structure of the present invention.

FIG. 1 of the accompanying drawing illustrates the noise elimination and water seal improvement device, essentially comprising the water inlet structure, water outlet structure and float unit, within, the water inlet structure mainly including a main body portion of the water inlet pipe (1), a water inlet water seal seat (11), water inlet water seal axle (12), water seal washer (13) and water seal seat O-ring (14) to the water inlet; the water outlet structure mainly including a water outlet pipe seat body portion (2), a noise eliminating water inlet unit (21), a U-shape packing (22), a water seal packing (23), an axle (24) and a triangle spring (25) while the float unit including the float (3), a float lever (31) and a crank rod (32). There is a screw bracket (4) disposed in between the main portion of the water inlet pipe (1) and the water outlet seat (2) with the inner water of the water outlet pipe seat (2) integrated with the protruding ring (26) while the peripherals of the hollow noise eliminating water inlet unit (21) is disposed of pores in round shape (211 and 212) and thread (212) on its neck, and at the top of the axle (24) disposed of screw bore (241), and three water inlet holes (242) at its bottom while the front end of the float crank rod (32)

indicating flat and spiral shape with bores (33 and 34) drilled respectively at the central position at the top end of the noise eliminating water inlet unit (21) and at the screw bores at both sides of the corresponding screw bracket (4).

There are three major steps involved in the assembling of the present invention, respecively are: the first step involving the placement of the water seal washer (13) on the top of the water inlet (5), then the water seal axle (12) is caulked to the water seal seat (11), and the water seal axle O-ring (14) snapped into the neck of the water seal seat (11), finally the assembled water seal seat (11) and water seal axle (12) are placed into the main portion of the water inlet pipe (1) with the enclosing position at the hollow bottom of water seal axle (12) engaged with the water seal washer (13); the second step involving the placement of triangle spring (25) on the bottom of the water outlet pipe seat (2), then in sequence the water seal packing (23) is slipped around the waist of the axle (24) and U-packing (22) the peck of axle (24), further, the assembled axle (24) is placed into the water outlet pipe seat (2) where the triangle spring (25) is holding against the bottom of the axle (24), finally, the water inlet unit (21) is screwed into the water outlet pipe seat (2) with the top end of axle (24) slightly protruding from the upper flange of the water inlet unit (21) and both the U-packing (22) and water seal packing (23) respectively pressing onto the hollow poriton of the axle (21) and the round protruding ring (26) at the water outlet pipe seat (2); and the third step involving in sequence that both ends of the float rod (31) are screwed respectively to the float (3) and the crank road (32).

Figure 2:
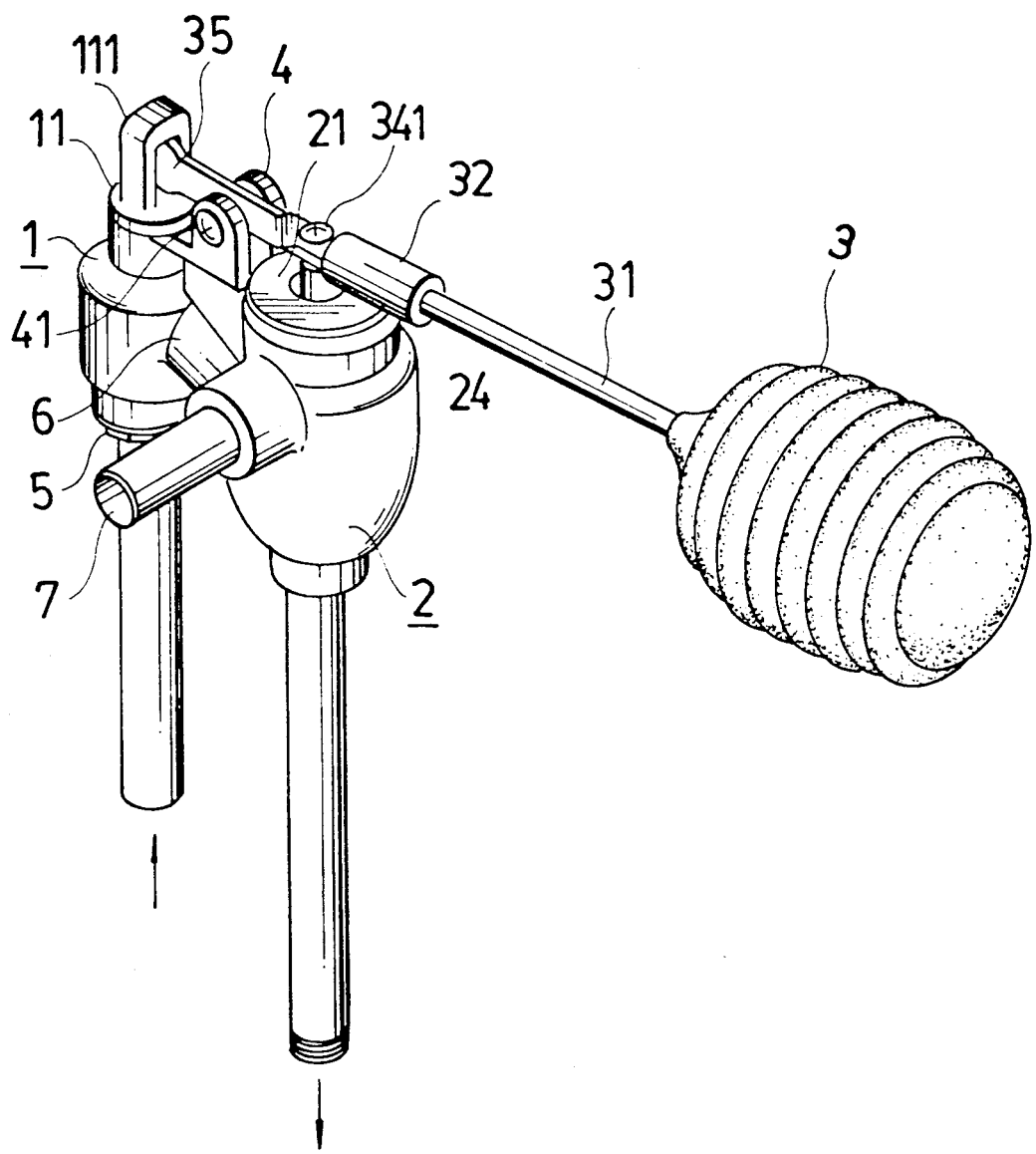
FIG. 2 is a view illustrating the assembly of the present invention.

Upon completing the aforesaid assembling steps, the flat tail end (35) of the crank rod (32) is placed into the U-shape screw base (4) with the fishtail fixing screw (41) to penetrate the screw bore (33) at the tail end (35) of the crank rod (32) to fix it securely on the screw base (4), while the tail end (35) of the crank rod exactly is penetrating into the reverse U-shape cover (111) at the water seal seat (11) of the water inlet, further short screw (341) is used to fix the crank rod (32) securely onto the top end of axle (24) through the other screw bore (34) of the crank rod (32), thus to complete the assembling of the present invention (please also refer separately to FIG. 2).

Figure 3:
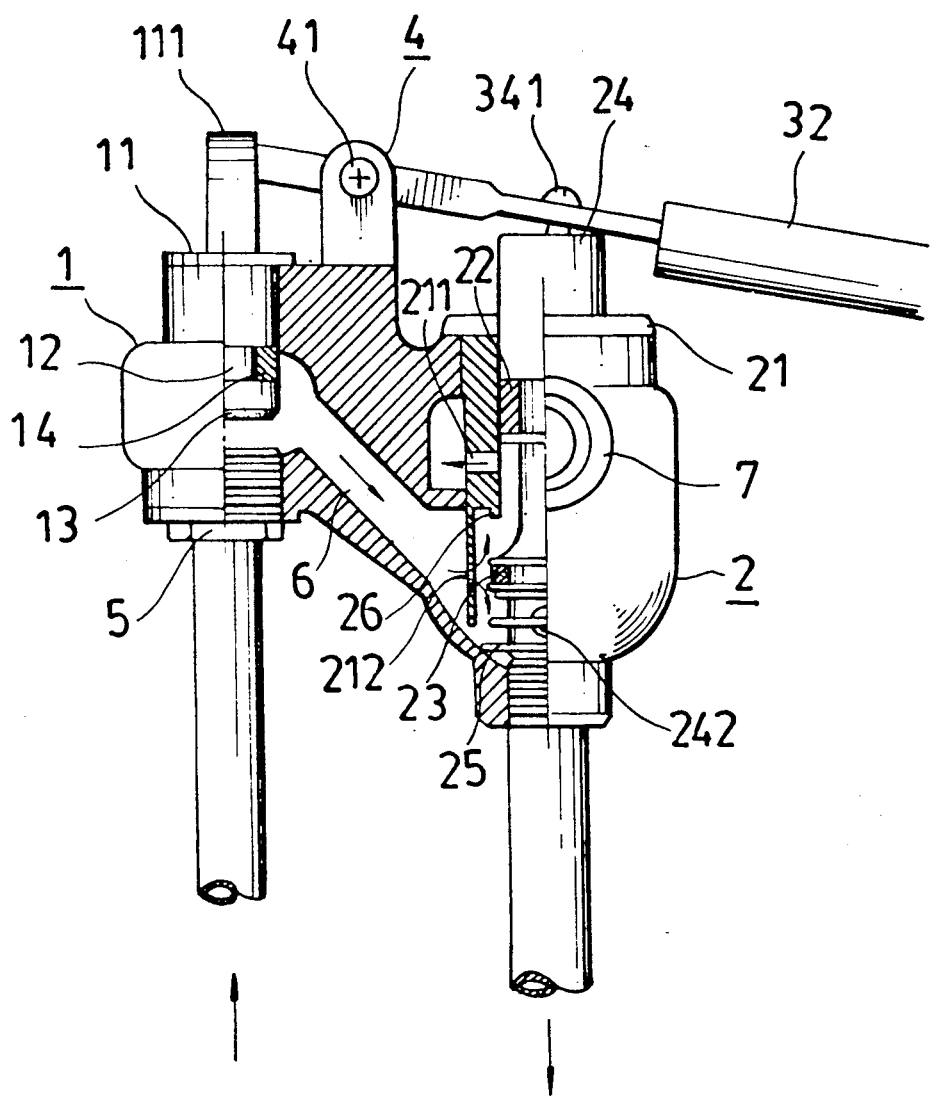
FIG. 3 is a view illustrating the action of the water intake in the cistern of the present invention.
Figure 4:
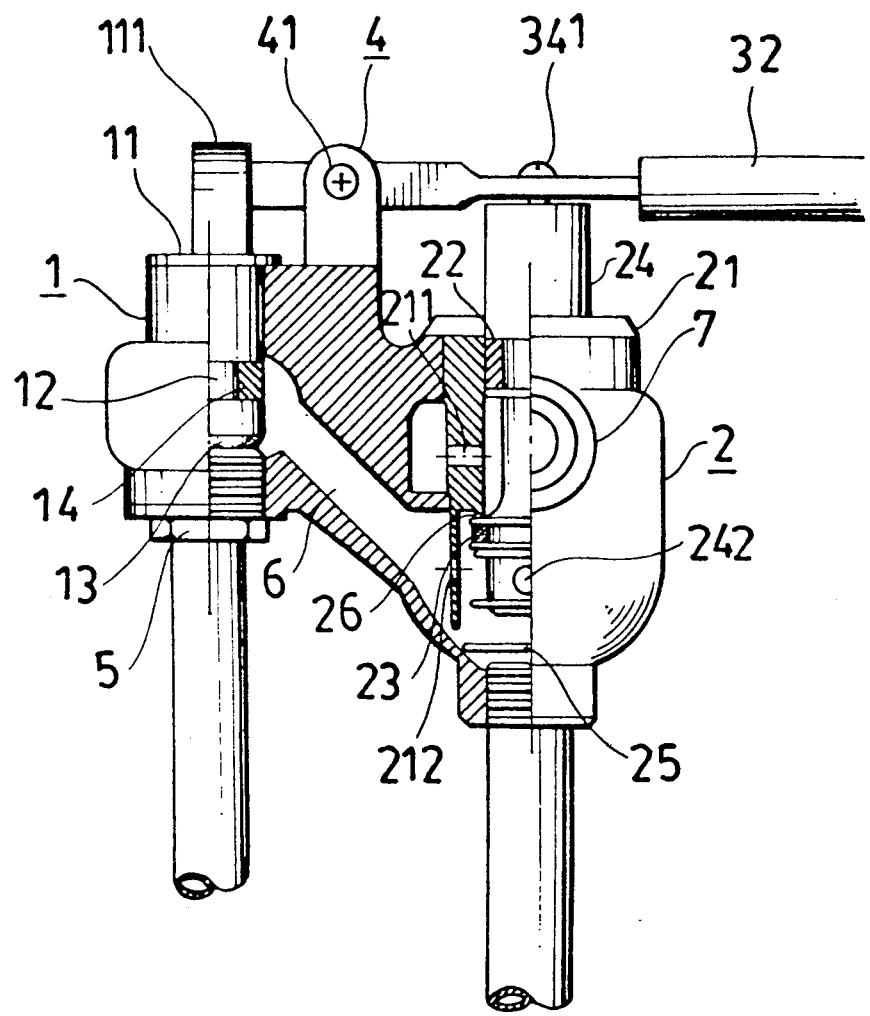
FIG. 4 is a view illustrating the action of the water seal in the cistern of the present invention.
Figure 5:
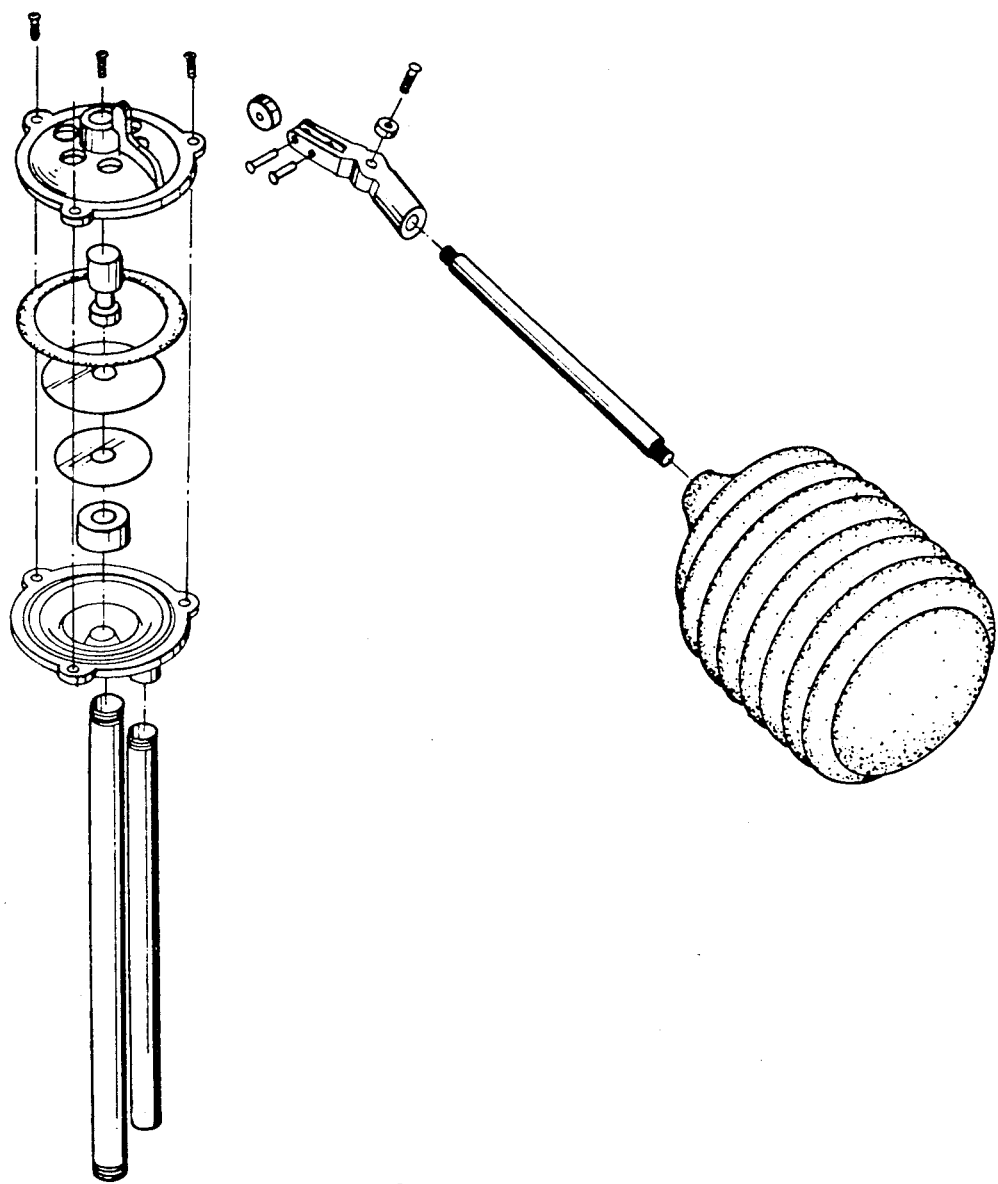
FIG. 5 is the view of the breakdown of the structure of water seal in the cistern of the flush toilet found in current market.

FIG. 3 illustrating the action of the present invention, within, when the toilet is flushing, the float lever (31) is lowered along with the water level inside the cistern, at this time, the supporting point for the crank rod (32) falling at where is screwed to the screw base (4), by using the leverage principle, the water seal seat (11) of the water inlet is elevated by the flat tail end (35) of the crank rod (32), thus the supporting point of the float unit is under less stress since the water level inside the cistern is at its low as the triangle spring (25) is slightly and indirectly holding against the crank rod (32); during water intake, the water seal washer (13) is floating up due to the flushing force from the water supply source, which flows into the cistern through the pivoting pipe (6) and the water inlet (242) at the bottom of the water outlet axle (24) and the float (3) is floating along with that of the water level, since the retreating pivot of the float unit is not applying the suspension arm working principle to notify the water inlet in the prior art, the water is sealed completely before the cistern is stopping the water inlet, this faster water seal will prevent the loss of water supply, while the water seal washer (13) will not subject to tear and wear by shifting positions because there is the fixed tract provided in the water inlet structure for the action taken place within the main portion of water inlet pipe (1), also the ons and offs at the water inlet (5) can be precisely achieved. It is worthy to be noted here that by applying the flux dynamics, round shape of holes (211 and 212) are disposed at the peripherals of the noise eliminating water inlet unit (21) with the upper hole (211) drilled for six holes at equal spacing on the circumference of the water inlet unit (21) and the lower hole (212) involving one bore drilled at the center of the semi-circle at the bottom of the water inlet unit (21), further, one bore is drilled each at the position 45 degrees to the both sides of this hole (212) so that once the water is flowing through the water outlet pipe seat (2), the water supply is producing the compliant flow due to holes (211 and 212) to free of the water hammering sound in conjunction with the diverting function by the axle (24), thus to achieve the noise eliminating effect. Furthermore, the short screw (341) connecting the crank rod (32) and axle (24) is functioning to regulate the water amount, which becomes greater from the water outlet structure when the screw (341) is sinking lower to tighten, and the less when the screw (341) is to loosen. Thanks to the U-packing (22), the water supply will not leak from the hollow portion at the top end of the noise eliminating water inlet unit (21) and, when the float unit is floating, the water seal packing (23) will once again press against the round protruding ring (26) at the water outlet pipe seat (2), making the water supply detour to prevent flow into the overflow pipe (7) through holes 211. At this point, water seal washer 13 will seal against inlet pipe 5 to even prevent water from flowing into the cistern through the water inlet (242) at the bottom of the axle (24).

I claim:

1. A float valve device having a water plug noise eliminator and water seal for a flush toilet comprising:
   A. a water inlet structure including:
      a main body portion having an elongated bore terminating at one end in a water inlet port for connection to a water inlet pipe; and
      valve means for sealing and unsealing said valve inlet port, said valve means including an inlet water seal seat having a lower portion extending into said bore and being sealed thereagainst by means of an O-ring and an upper cover portion protruding out of said bore, a water seal axle attached to said inlet water seal seat and slidably mounted in said bore, and a water seal washer carried by said water seal axle, said inlet water seal seat sealing and unsealing said valve inlet port in response to the sliding movement of said water seal axle;
   B. a water outlet structure including:
      a water outlet pipe seat body portion in fluid communication with said bore of said main body portion, said water outlet pipe seat body portion including an outlet port with a ring portion thereabout;
      a noise eliminating unit fixedly secured within said water outlet pipe seat body portion, said noise eliminating unit defining a longitudinal axis and including first and second longitudinal spaced sets of holes and an inner sealing ring between said sets of holes;
      an elongated axle member including a lower portion slidably mounted within said noise eliminating unit and an upper portion projecting above said water outlet pipe seat body portion, first and second longitudinally spaced seal packings between said noise eliminating unit and said axle member, said lower portion of said axle member being formed with a plurality of water ports; and spring means acting between said ring portion of said water outlet pipe seat body portion and said axle member, said water outlet structure permitting water to flow from said water inlet structure through said water outlet port of said water outlet pipe seat body portion when said axle member slides relative to said noise eliminating member against the biasing force of said spring means, and preventing the flow of water through at least one of said first and second longitudinal spaced sets of holes in said noise eliminating unit by shifting of said axle member relative to said noise eliminating unit such that said second seal packing creates a seal between said axle member and said inner sealing ring; and C. a float unit including:

a crank rod having first and second ends, said crank rod being pivotally supported intermediate its ends between said water inlet structure and said water outlet structure, said first end of said crank rod being interconnected with said upper cover portion of said valve means such that pivoting of said crank rod causes sliding movement of said water seal axle, said crank rod being further connected at a point between the pivot connection and said second end to said upper portion of said axle member to impart sliding movement to said axle member relative to said water outlet pipe seat body portion upon pivoting of said crank rod;

a float lever having a first end secured to the second end of said crank rod, and a second end; and a float attached to the second end of said float lever.

2. A float valve device as claimed in claim 1, wherein first and second sets of holes each comprise a plurality of circumferentially spaced holes.

3. A float valve device as claimed in claim 1, wherein the connection point between said crank rod and the upper portion of said axle member includes a screw engaged with said crank rod and said axle member for regulating the outlet water flow.

* * * * *